United States Patent [19]

Lombard et al.

[11] 4,071,042

[45] Jan. 31, 1978

[54] ELECTROMAGNETIC ACTUATOR, NOTABLY FOR HYDRAULIC SERVO-CONTROL VALVE

[75] Inventors: Claude Edmond Lombard; Jean-Marie Bouvet, both of Boulogne-Billancourt, France

[73] Assignee: Regie Nationale des Usines Renault, Boulogne-Billancourt, France

[21] Appl. No.: 686,505

[22] Filed: May 14, 1976

[30] Foreign Application Priority Data

May 16, 1975 France ................................ 75 15331
July 25, 1975 France ................................ 75 23326

[51] Int. Cl.² ........................ F16K 29/00; F16K 31/08

[52] U.S. Cl. ................................. 137/332; 137/116.3; 137/495; 251/65; 251/129; 335/237; 335/266

[58] Field of Search .................. 137/332; 251/65, 129; 310/13, 27; 335/229, 230, 231, 236, 237, 266, 268, 269, 273, 274

[56] References Cited

U.S. PATENT DOCUMENTS

| | | | |
|---|---|---|---|
| 2,938,151 | 5/1960 | Bowditch | 310/27 X |
| 3,129,347 | 4/1964 | Tognola | 310/27 X |
| 3,172,421 | 3/1965 | Rayfield | 137/332 |
| 3,202,886 | 8/1965 | Kramer | 335/268 X |
| 3,305,209 | 2/1967 | Bender et al. | 335/229 X |
| 3,670,837 | 6/1972 | Olson | 335/268 X |
| 3,746,937 | 7/1973 | Koike | 310/13 X |

*Primary Examiner*—A. D. Pellinen
*Attorney, Agent, or Firm*—Fleit & Jacobson

[57] ABSTRACT

Electromagnetic actuator, especially for actuating a hydraulic servo-control valve, which comprises a magnetic shell constituting a body of revolution and a concentric armature-forming permanent magnet, at least one annular field coil, the field coil and the armature being adapted to move axially in relation to each other. The movable member (field coil or armature) is caused to move by the resultant electromagnetic force resulting from the energization of the field coil to which a control direct current is applied and by the antagonistic force of a repulsion member incorporated in the magnetic shell. The field coil is longer than the armature so that the electromagnetic force is independent of the movement of the movable member and proportional to the control direct current. The movable member is caused to perform simultaneously a cyclic motion superposed to the axial movement in order to eliminate the friction hysteresis of the hydraulic valve.

12 Claims, 11 Drawing Figures

Figures 1, 8:
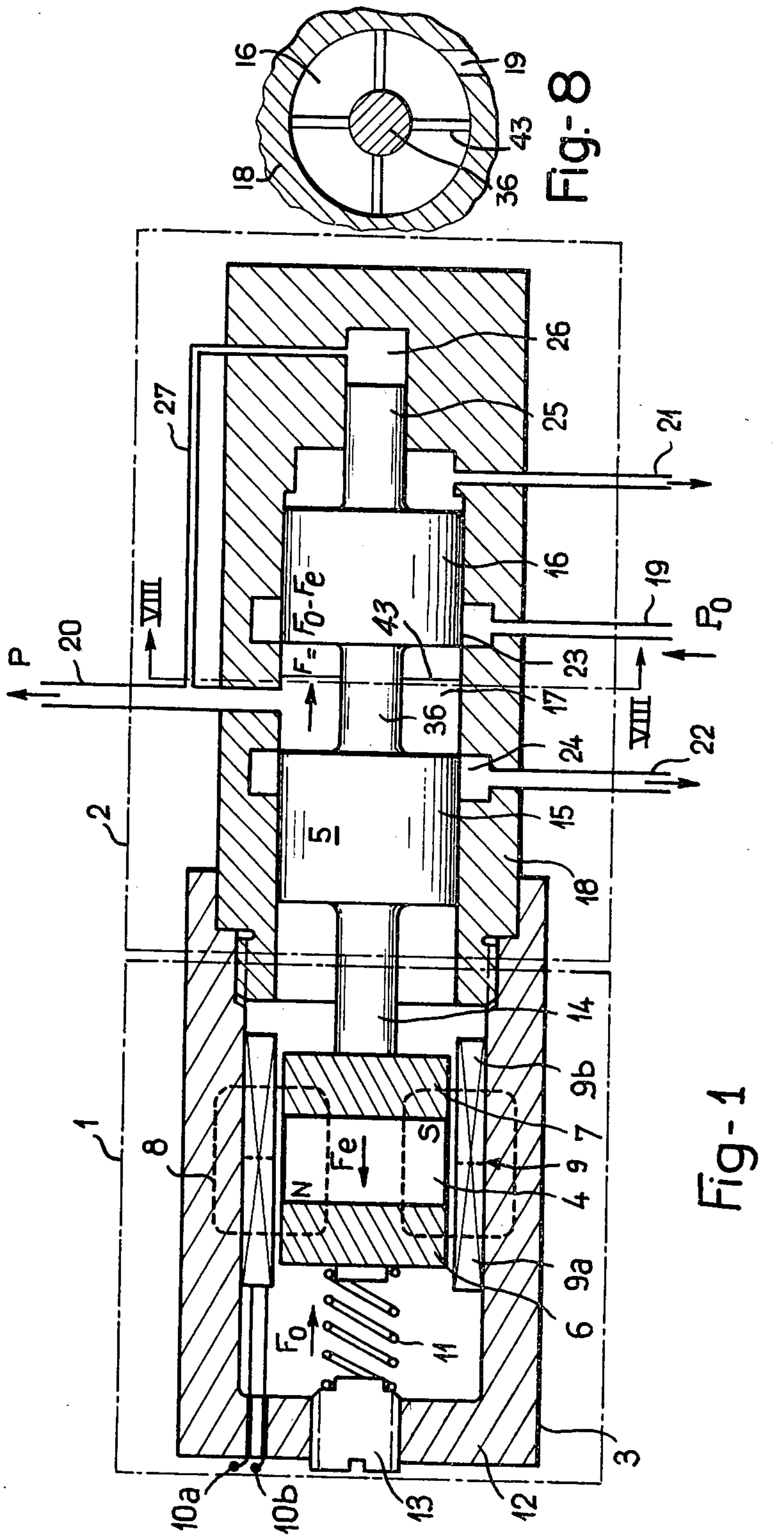

Fig - 5
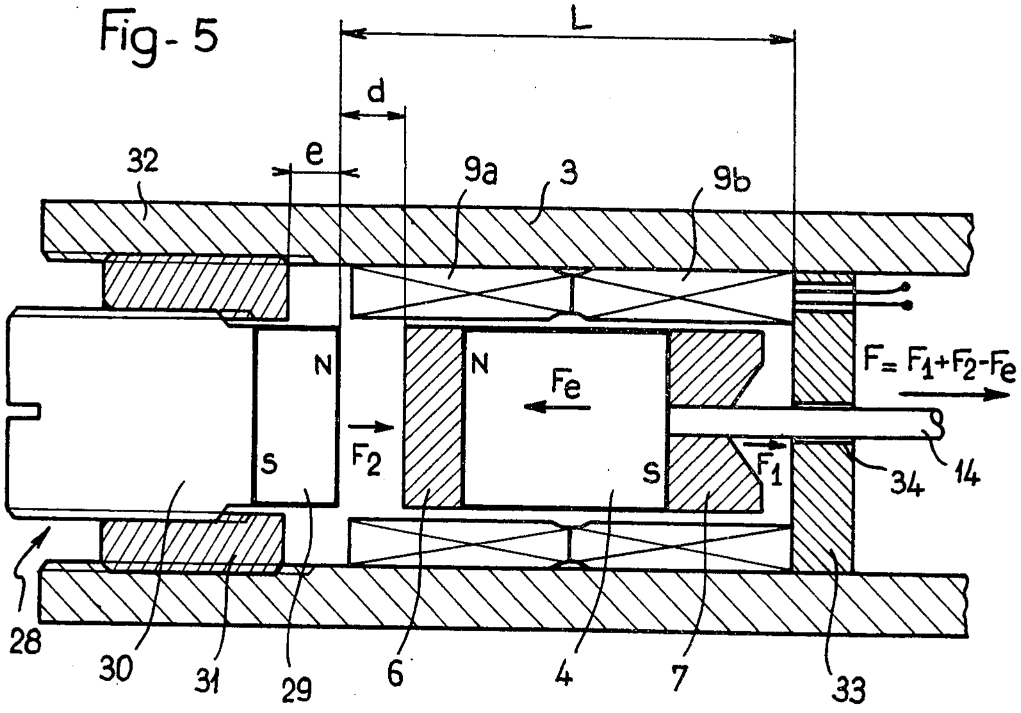
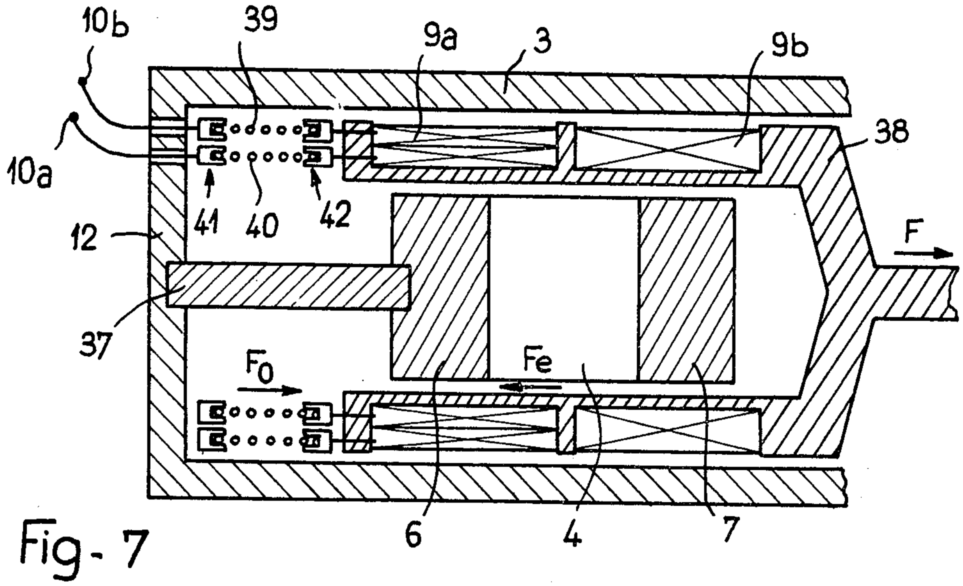
Fig - 7

ELECTROMAGNETIC ACTUATOR, NOTABLY FOR HYDRAULIC SERVO-CONTROL VALVE

The invention relates in general to electromagnetic actuators and has specific reference to an improved electromagnetic actuator adapted to drive a hydraulic servo-control valve and more generally any member requiring a substantially linear relationship between the energizing current and the resultant force.

This actuator is applicable more particularly to hydraulically controlled automatic change-speed mechanisms for motor vehicles, with a view to regulate a pressure as a function of an electric control signal.

In automatic change-speed mechanisms the hydraulic control system comprises as a rule one or more regulation valves adapted to adjust one or more pressures, notably the line pressure, at an optimum level corresponding to a predetermined rate of operation. In most instances, these regulation valves are controlled or monitored by an auxiliary pressure usually referred to as the monitoring pressure. This monitoring pressure should be proportional to an electrical magnitude corresponding to the conditions of operation of the motor vehicle, such as engine velocity (or turbine velocity), the engine load, engaged transmission or gear ratio, etc. . . . Therefore, in this case, the monitoring pressure delivered to the regulation valve must be varied with precision in strict conformity with the electric control signal. Various actuators have already been proposed with a view to produce a pressure proportional to an electric control signal.

Hitherto known actuators of this type utilize mainly the electromagnetic pull exerted on a movable armature made from a material having a certain magnetic hysteresis. Therefore, the electromagnetic force generated by the field magnet and exerted on the armature, and consequently the monitoring pressure, is not a linear function of the control current, so that the degree of precision of monitoring pressure adjustment is obviously inadequate. Moreover, the electromagnetic pull undergoes a substantial variation during the stroke of the movable armature, and this further impairs the necessary adjustment precision. In the case of a hydraulic valve wherein the slide member or spool is driven by the movable armature of the actuator, a well known by-effect takes place, which will be referred to hereinafter as the "friction hysteresis", and consists of a certain tendency to jamming or a certain resistance to sliding movements. Now, whereas this effect is not detrimental in the case of an actuator operating as an "open-and-shut" device, if a proportional adjustment is required even the slightest jerk cannot be tolerated.

Devices based on the principle of loudspeaker magnetic circuits are also known, but they are objectionable because they are heavy, cumbersome and have a low power rating, for they have only one active magnetic gap.

It is the primary object of the present invention to avoid the above-listed inconveniences by providing a simple, compact, reliable and high-precision electromagnetic actuator, which is free of both magnetic hysteresis and friction hysteresis, whereby the monitoring pressure obtaining at the output of a hydraulic valve be strictly proportional to the actuator control current.

For this purpose, the present invention provides an electromagnetic actuator, notably for operating a hydraulic servocontrol valve, which comprises a magnetic shell forming a body revolution housed within the gap formed between said shell and a concentric, armature-forming permanent magnet, the field magnet and the armature being adapted to move in the axial direction with respect to each other, this actuator being characterised in that the movable member (field or armature) tends to move under the resultant force consisting of the electromagnetic force generated by the energization of the coil through which a control direct current is caused to flow, and of the antagonistic force generated by a repulsion member rigid with said shell, that the field coil is longer than the armature length so that the electromagnetic force be independent of the movement of said movable member and proportional to the control current, and that said movable member is caused to move cyclically in conjunction with said movement, in order to eliminate the friction hysteresis of the hydraulic valve.

The specific composition of the permanent magnet, which comprises substantial proportions of materials selected from the group of rare earths, and the provision of a pole piece on each lateral surface of the magnet, are such that considerable magnetic energy is released, of which the lines of flux are channelled with the minimum amount of leakage. Said flux lines circulating in the N/S direction of the permanent magnet through the external circuit are closed through the magnetic circuit of the shell by passing twice radially and in opposite directions through the annular gap occupied by the field coil. Considering the direction of the coil turns, it is possible to create electromagnetic forces of which the actions exerted on the movable member are conjugated so as to constitute a powerful actuator.

According to another feature characterising this invention, the repulsion member associated with the movable member may consist of a mechanical compression spring reacting against said shell or preferably an additional permanent magnet wherein advantage is taken of the magnetic repulsion of one pole against the pole of same sign of the permanent magnet constituting said movable member. This second solution is advantageous in that no mechanical linkage whatsoever is provided between the movable member and the magnetic shell, and that this additional magnet can easily be shunted by adjusting its degree of penetration into the magnetic member for adjusting in turn the repulsion force to a predetermined value.

According to another feature characterising this invention, the above-defined friction hysteresis is avoided by the fact that the spool member of the hydraulic valve which is actuated by the movable member of said actuator cannot under any circumstances be stopped completely, this spool member being constantly caused to perform a low-amplitude cyclic or oscillating motion. For this purpose, an alternating current of low amplitude and predetermined frequency may be superposed to the direct current energizing the field coil. In the case of a magnetic repulsion member the movable member may be arranged to rotate freely within the actuator. Advantage is taken of this liberty for enabling the spool of the hydraulic valve to rotate by means of internal vanes or blades responsive to the fluid flowing through the valve.

Figure 3:
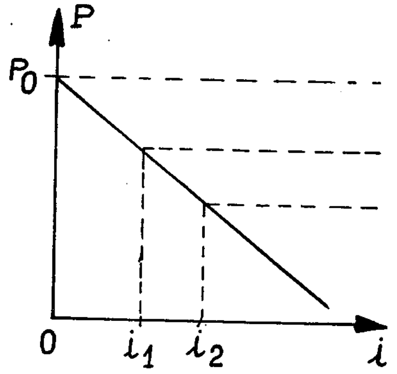

Other advantages and specific features characterising this invention will appear as the following description proceeds with reference to the attached drawings illustrating diagrammatically by way of example a typical form of embodiment thereof with various modifications. In the drawings:

FIG. 1 illustrates in longitudinal section the electromagnetic actuator of this invention coupled to a spool-type hydraulic valve, wherein the field means is stationary and the armature is axially movable against the force of a repulsion member consisting of a mechanical spring;

FIGS. *2a* and *2b* illustrate diagrammatically the resultant force applied to the movable armature as a function of the control current supplied to the field means, and the same resultant force as a function of the axial movement of the armature under different control currents taken as parameters, respectively;

FIG. 3 illustrates the variation in the monitoring pressure obtained at the output of the hydraulic valve as a function of the control current;

FIGS. *4a* and *4b* illustrate the wiring arrangement of the field coil and its practical embodiment, respectively;

FIG. 5 illustrates in longitudinal section a preferred form of embodiment of the electromagnetic actuator wherein the repulsion member consists of an adjustable magnetic shunt;

FIGS. *6a* and *6b* illustrate respectively as a function of the movement of the movable armature the repulsion force $F_2$ and attraction force $F_1$ exerted respectively on the armature poles, and the resultant repulsion forces Fo for different adjustments *e* of the magnetic shunt, and FIG. 7 illustrates in longitudinal section a modified form of embodiment of the actuator wherein the armature is stationary and the field means axially movable against the action of compression springs.

FIG. 8 illustrates in axial section a modified embodiment of the electromagnetic actuator of FIG. 1 taken along line VIII—VIII of FIG. 1.

Referring first to FIG. 1, this electromagnetic actuator assembly 1 is mechanically connected or coupled to the spool of a hydraulic valve 2. The actuator comprises essentially a magnetic shell 3 constituting a body of revolution constituting an extension of the hydraulic valve to which it is coupled by screw means, and a concentric permanent magnet 4 magnetized N/S along its axis, adapted to move axially and to carry along during its stroke the spool member 5 of the hydraulic valve to which it is positively connected. The permanent magnet 4 comprises a pair of pole pieces 6, 7, each bonded to one of its side faces so as to convey the flux lines 8 which form a loop through said shell by passing twice and in opposite direction through the annular gap formed between the pole pieces 6, 7 and shell 3. This gap is occupied by a field coil 9 or, more exactly, by a pair of half-coils *9a*, *9b* wound in opposite direction according to a specific form of embodiment to be described presently in detail. This coil is supplied with direct current, i.e. the control current of this actuator, through electric connections *10a*, *10b* disposed on the same side of said coil. In the exemplary form of embodiment shown in FIG. 1, the central permanent magnet 4 carrying the pole pieces 6, 7 is constantly urged towards the spool valve 2 by means of a mechanical non-magnetic coil compression spring 11 reacting against the lateral end flange 12 of the magnetic shell the force exerted by this spring is adjustable by means of an axial screw 13 engaging a tappered hole in said shell flange 12.

Operation

The actuator according to this invention operates as follows:

When no control current is fed to the coil 9 of the field means, the movable armature 4 (comprising the permanent magnet and the pole pieces) is urged by the repulsion member 11 providing a constant yet adjustable force Fo directed to the right, as seen in FIG. 1. The valve spool comprising a stem 14 and a pair of lands or pistons 15, 16 separated by a control chamber 17 is thus movable in the same direction as the movable member 4 in an aluminium or light alloy body 18. Thus, the control chamber 17 permits the passage of a control fluid delivered at the feed pressure Po through a feed line 19 and flowing out from said chamber through an outlet line 20 delivering the monitoring pressure P to be adjusted. The lands or pistons 15, 16 can move freely during their axial movement due to the provision of a leakage line 21 connected to the fluid reservoir (not shown). Another leakage line 22 also connected to the fluid reservoir is closed by the first piston 15 when the sliding spool is in its endmost position to the right, as seen in FIG. 1.

From the foregoing it is clear that when no current is fed to the coil or in case of current failure the monitoring pressure P has its maximum value equal to the supply pressure Po. This pressure corresponds to a positive safety protecting the control fluid responsive members against any damage.

When control current *i* is fed to the field coil 9, the action exerted by the strong magnetic field on the coil turns creates an electromagnetic force which, according to the Laplace rule, is perpendicular to the other two vectors corresponding to the field and current, respectively. Considering the direction of flow of the flux lines (i.e. from the North pole to the South pole) of the permanent magnet 4 through the external circuit 6, 7, 3, the field coil must necessarily be divided into two half-coils *9a*, *9b* having oppositely wound turns. Thus, all the electromagnetic forces have the same direction, i.e. in opposition to the initial force Fo of spring 11. The resultant electro-magnetic force Fe has its maximum efficiency due to the relatively small dimensions of the component elements involved, not only by virtue of the existence of pole pieces 6, 7, conveying the flux 8 and to the use of the gaps by the coil having inverted windings, but also on account of the provision of a central permanent magnet 4 having a relatively high coercitive field, which releases a high specific energy. Preferably, materials selected from the group of rare earths, such as samarium-cobalt and cerium-cobalt mixed metals, will be used. The combination of the above-defined features affords a maximum utilization of the lines of force while minimizing the leakage flux.

The present invention takes advantage of the perfectly linear magnetization (introduction as a function of field) of this type of permanent magnet for generating an electromagnetic force Fe strictly proportional to the control current *i* flowing through the coil 9. Moreover, care is taken to provide an annular coil considerably longer than the armature, including the pole pieces, so that this feature, in combination with the gap evenness, yield an electromagnetic force independent of the magnet movement within wide limits. In other words, the electromagnetic force is subordinate only to the control current, for the purpose contemplated, with a perfectly linear relationship.

Figure 2A:
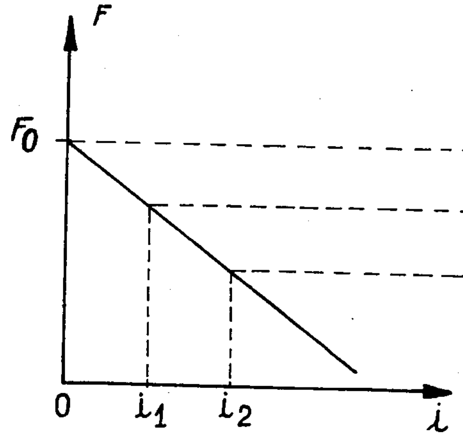
Figure 2B:
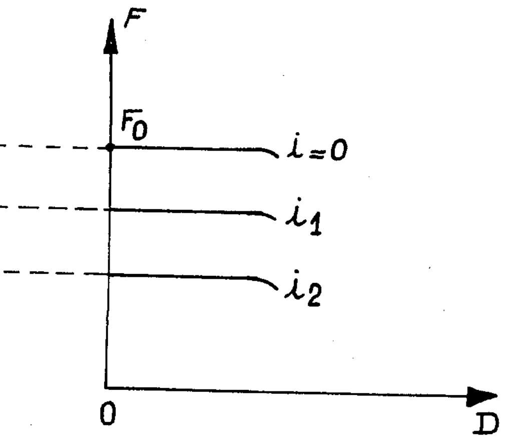

FIGS. 2*a* and 2*b* illustrates diagrammatically this essential feature of the construction according to this invention. The electromagnetic force Fe, constantly lower than the initial force Fo of the spring within the range of operation of the actuator, is deducted from this initial force to provide a resultant actuating force F exerted on the sliding spool of the hydraulic valve directed to the right, as seen in FIG. 1, which is a decreasing linear function of the control current *i*. For a given control current *i*, the actuating force F has a well-defined value, irrespective of the movement accomplished by the armature (FIG. 2*b*). When changing from value $i_2$ to value $i_1$, the lands or pistons 15, 16 of the valve spool move to the right, thus increasing the cross-sectional area of the restriction port 23 connected to the feed line 19 and decreasing the cross-sectional area of the other restriction port 24 communicating with the leakage line 22. The monitoring pressure P will thus tend to increase in conjunction with the pressure applied to the rear face 25 of the piston in a reaction chamber 26 via a reaction line 27. The reaction force will thus counteract the actuating force F having produced this reaction force, until a state of equilibrium is obtained. The preceding servo-action provides a linear relationship between the control current and the monitoring pressure P delivered via line 20; in said servo-action the force F driving the spool is the reference value. Thus, a electro-hydraulic transducer or converter capable of meeting the requirements set forth, as exemplified in FIG. 3, is obtained.

Figure 4B:
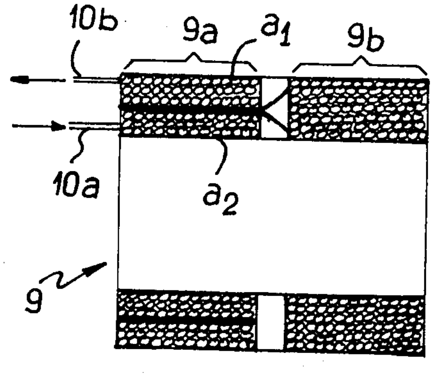
Figure 4A:
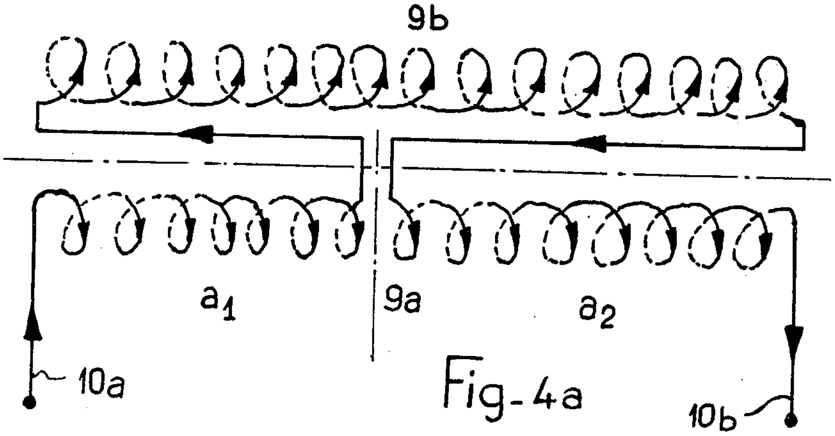

The field coil 9 comprises a pair of adjacent half-coils or windings 9*a*, 9*b* wound in opposite directions according to the principle shown diagrammatically in FIG. 4*a*. One half-coil 9*a* actually consists of a pair of separate concentric windings *a*1, *a*2 (FIG. 4*b*) so connected that the two feed wires 10*a*, 10*b* can be disposed on the same side of the coil to facilitate the construction and assembly of the actuator (FIG. 1). For this purpose, the output wire of the first winding *a*1 wound in the clockwise direction is connected to the input wire of the second half-coil 9*b* wound in the counter-clockwise direction and having its output wire connected in turn to the input wire of the second winding *a*2 also wound in the clockwise direction. With this type of winding it is also possible to balance the wire lengths and therefore to distribute symmetrically the current densities among the active gaps. To obtain a maximum magnetic field effect on the coil turns, the best possible use should be made of the annular gap left between the pole pieces 6, 7 and shell 3. Therefore, the coil 9 is free of any supporting mandrel or like member. This mandrel, made of Teflon, is removed upon completion of the winding operation accomplished with heat-adhesive or plain enameled wire subsequently impregnated with a suitable thermosetting resin. The relative magnitude of *a*1 and *a*2 is immaterial, but for the sake of convenience each winding will comprise at least one layer of turns.

According to another essential feature characterising this invention and in order to eliminate the friction hysteresis mentioned in the preamble of the present specification, a low-amplitude electric alternating current having a predetermined frequency and superposed to the control direct current is fed simultaneously to the field coil 9 for impressing to the armature 4 and therefore to the hydraulic valve 2 an axial oscillating or reciprocating motion superposed to the linear operating movement.

FIG. 5 illustrates a preferred form of embodiment of the actuator wherein the repulsion member is a magnetic shunt 28 consists of an additional permanent magnet 29 bonded to a magnetic adjustment member 30. This adjustment member 30 is adapted to be set in the axial direction by screwing or unscrewing a ring 31 also of magnetic material such as ductile iron which is screwed in turn in one end 32 of the shell. To obtain the repulsive force, poles of same sign (N in FIG. 5) of the additional magnet 29 and armature magnet 4 are disposed in face to face relationship. The distance *d* designates the magnetic gap between the two magnets, which is adjustable by rotating the adjustment member 30 and/or the ring 31, and the distance *e* denotes the degree of penetration of the additional magnet 29 into the ring 31 and therefore the corresponding modification of the action exerted by the magnetic shunt 28. This distance *e* can easily be adjusted by means of the adjustment member 30. By changing the position of the adjustment member 30 and ring 31 with respect to shell 32, the distance L can be modified as desired without altering the value of *e*, and this constitutes an advantageous feature as clearly apparent from the following description of the operation of this modified structure. The magnetic circuit is closed, at the opposite end of shell 32, by a transverse magnetic member 33 in which a central bore is formed to permit the passage of the stem 14 of the hydraulic spool. The coil 9*a*, 9*b* is the same as in the preceding form of embodiment, but the feed terminals 10*a*, 10*b* thereof are disposed on the same side as the magnetic member 33, for the sake of convenience.

Figure 6A:
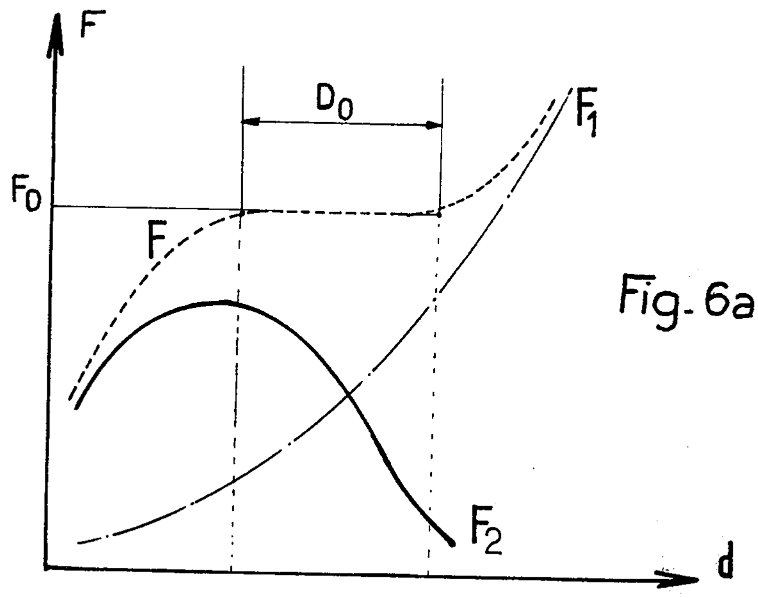

When no control current flows through the field coil, the initial repulsion force Fo exerted on the armature is the arithmetical sum of the repulsion force F2 generated by the registering poles of same sign (N) of the additional magnet 29 and armature magnet 4, on the one hand, and of the attraction force F1 exerted by the opposite pole (S) of the armature magnet on the magnetic member 33, on the other hand. FIG. 6*a* illustrates the phenomenon produced as a function of the armature movement, which can be assimilated to a variation in the magnetic gap *d*. The pattern of curves F1 and F2 is related to the presence and the specific shape of the pole pieces 6, 7, so that the resultant repulsion force Fo be constant on the area Do corresponding substantially to the length L of the permissible actuator movement or beat.

Figure 6B:
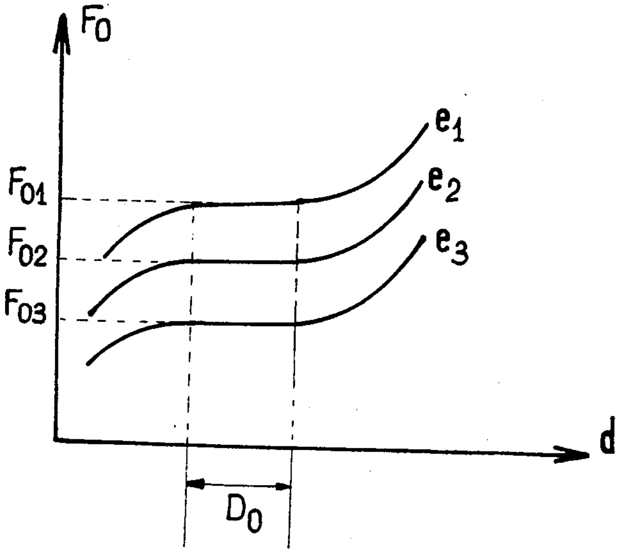

The force Fo may be adjusted to a predetermined value (FIG. 6*b*) by varying the degree of penetration *e* of the magnetic shunt into the ring 31. This system is the magnetic equivalent of the spring adjustment member 13 of the preceding form of embodiment (FIG. 1). When the coil is energized by the control direct current the operation is exactly the same as in the preceding construction, since the electromagnetic force Fe exerted on the armature is deducted from the initial repulsion force Fo to yield a resultant actuating force F directed towards the hydraulic valve.

The major feature characterising the modified embodiment of FIG. 5 lies in the elimination of any mechanicam contact between the movable member and the actuator shell. Thus, the central armature 4 is movable not only axially but also rotatably, so that a different means may be contemplated for eliminating the friction hysteresis. More particularly, the cylindrical spool or sliding member 5 of the hydraulic valve may be caused to rotate about its axis by providing vanes or blades 43 properly disposed within the valve, for example on the lateral walls of control chamber 17, as shown in FIG. 8 and in dash and dot lines in FIG. 1. With this arrangement, the blades or vanes are exposed to the flow of fluid under pressure directed tangentially against said walls via the feed line 19. Another arrangement may comprise the aforesaid vanes or blades disposed on the stem 36 interconnecting the adjacent lands or pistons 15 and 16. In this case, the electric system described hereinabove may be either substituted for, or associated with, the vane system for eliminating the friction hysteresis.

FIG. 7 illustrates another modified form of embodiment wherein the fixed and movable members are inverted. Thus, the permanent magnet 4 carrying its pole pieces 6 and 7 is rigidly fastened to the shell 3 by means of an intermediate non-magnetic member 37, and the movable armature connected directly to the hydraulic valve consists of a coil 9*a*, 9*b* wound on a non-magnetic support 38 and is responsive to the electromagnetic force Fe proportional to the control current flowing through the coil and also to the constant antagonistic force Fo of the repulsion member consisting of a pair of concentric compression springs 39, 40 prestressed between the end flange 12 of the shell and the armature support 38. It is clear that these springs 39, 40 also act as electrical connecting means for supplying current to the armature coil and are therefore retained between two pairs of grooved rings 41, 42 electrically insulated from the shell and the coil support. The abovedescribed electric arrangement for eliminating the friction hysteresis is also applicable to this modified structure.

What is claimed as new is:

1. An electromagnetic actuator comprising a tubular magnetic shell, an annular field coil means disposed concentrically within the shell and adapted to be connected to a control direct electric current, an armature means formed of a permanent magnet disposed axially within the field coil and having an axial magnetization and two pole pieces attached to the side faces of the permanent magnet, one of said armature and field coil means being fixed and the other of said means being axially movable relative to said shell, and a repulsion member interposed between said shell and said movable means to exert on the latter a force opposed to the electromagnetic force exerted on said movable means by the control direct current supplied to said field coil means, said field coil means being axially longer than said armature means and pole pieces combined and including a pair of adjacent half-coils wound in opposite directions, each one of said half-coils overlapping respectively one of the two pole pieces.

2. An electromagnetic actuator according to claim 1, wherein said movable means is subjected to an axial reciprocating motion by superposition on the control direct current of an electric alternating current of relatively low-amplitude with respect to the amplitude of said control direct current.

3. An electromagnetic actuator according to claim 1, for actuating a hydraulic servo-control valve having a spool member and a feed line controlled by the latter, said spool member being connected to said movable means and including vanes responsive to fluid flow from the feed line, the latter being directed tangentially relatively to said spool member so as to impress a rotary motion to said spool member and movable means when fluid flow is delivered from said feed line.

4. An electromagnetic actuator according to claim 1, wherein one of said half-coils comprises a first and second separate concentric winding, said first winding having its output connected to the input of the other half coil of which the output is connected in turn to the input of the second winding.

5. An electromagnetic actuator according to claim 1, wherein said adjacent half-coils consist of windings impregnated with thermosetting resin.

6. An electromagnetic actuator according to claim 1, wherein said permanent magnet contains substantial proportions of at least one element selected from the group of rare earths such as samarium.

7. An electromagnetic actuator according to claim 1, wherein said repulsion member is a spring.

8. An electromagnetic actuator according to claim 1, wherein said movable means is said armature means and said repulsion member comprises a magnetic shunt adjustable axially within said shell.

9. An electromagnetic actuator according to claim 1, wherein said movable means is said armature means and said repulsion member comprises a magnetic shunt adjustable axially within said shell, and said magnetic shunt comprises a ring mounted within said shell and being axially adjustable in relation to said shell, an adjustment member mounted in said ring and being axially adjustable in relation to said ring and an additional permanent magnet having one pole bonded to said adjustment member and the other pole facing a pole of the same polarity of said armature means.

10. An electromagnetic actuator according to claim 1, wherein said movable means is said armature means and said repulsion member comprises a magnetic shunt spaced from one of said pole pieces and adjustable axially within said shell, and wherein a magnetic member is disposed transversely within said whell spaced from the other of said pole pieces in such manner as to form a magnetic circuit with said magnetic shell and said magnetic shunt.

11. An electromagnetic actuator according to claim 1, for actuating a hydraulic servo-control valve including a spool member connected to said movable means to deliver a variable fluid pressure, wherein the force exerted by said repulsion member is greater than said electromagnetic force throughout the range of variation of said control direct current, and that a reaction force is provided on said spool member depending on said variable fluid pressure and adding with said electromagnetic force to counteract the force exerted by said repulsion member.

12. An electromagnetic actuator according to claim 1, wherein said field coil means is said movable means and said repulsion member comprises concentric spring means which are adapted to form the connection between said field coil means and the control direct current.

* * * * *